(12) United States Patent
Mauch et al.

(10) Patent No.: US 6,244,201 B1
(45) Date of Patent: Jun. 12, 2001

(54) POTATO PLANTER

(75) Inventors: Wayne Mauch, Pocatello, ID (US); Larry Anderson, Torrington, WY (US)

(73) Assignee: Spudnik Equipment Company, Blackfoot, ID (US)

( * ) Notice: Subject to any disclaimer, the term of this patent is extended or adjusted under 35 U.S.C. 154(b) by 0 days.

(21) Appl. No.: 09/596,766

(22) Filed: Jun. 19, 2000

(51) Int. Cl.$^7$ ...................................................... A01C 9/02
(52) U.S. Cl. ............................................................. 111/172
(58) Field of Search .................................. 111/170, 171, 111/172, 200, 900, 906

(56) References Cited

U.S. PATENT DOCUMENTS

| | | | |
|---|---|---|---|
| 3,982,671 | 9/1976 | Curl | 322/178 |
| 3,986,464 | 10/1976 | Uppiano | 111/59 |
| 4,044,697 | 8/1977 | Swanson | 111/66 |
| 4,193,357 | 3/1980 | Freeman et al. | 111/34 |
| 4,221,305 | 9/1980 | Freeman et al. | 221/131 |
| 4,243,154 | 1/1981 | Freeman et al. | 221/253 |
| 4,259,912 | 4/1981 | Stocks et al. | 111/77 |
| 4,264,023 | 4/1981 | Stocks et al. | 222/614 |
| 4,955,297 | 9/1990 | Tsukamoto | 111/152 |
| 5,009,175 | 4/1991 | Pember et al. | 111/173 |
| 5,170,909 | 12/1992 | Lundie et al. | 221/211 |
| 5,181,573 | 1/1993 | Almen | 172/459 |
| 5,323,721 | 6/1994 | Tofte et al. | 111/200 |
| 5,535,689 | 7/1996 | Anderson et al. | 111/177 |

OTHER PUBLICATIONS

Cramer Technik GmbH, "Everything for the Planting of Potatoes" (date unknown).

*Primary Examiner*—Christopher J. Novosad
(74) *Attorney, Agent, or Firm*—Workman, Nydegger & Seeley (57) ABSTRACT

A potato seed planter includes one or more planting units with an endless conveyor. A plurality of cups are attached to the conveyor and each cup receives a potato seed as the conveyer travels upwardly between upper and lower sprockets. As the cups pass around the upper sprocket, any extra seeds in cups are removed by centrifugal force, differential velocity and/or a vibration unit. These extra potato seeds are recycled and returned to the seed bowl. The cups then travel through a generally horizontal singulation section and around a third sprocket. The cups are inverted as they pass around the third sprocket and the seeds fall onto the back surface of the next forwardly adjacent cup. A guide structure holds the seeds in the desired position until they reach a discharge area where the individual seeds are discharged into the furrow.

54 Claims, 7 Drawing Sheets

POTATO PLANTER

BACKGROUND OF THE INVENTION

1. Field of the Invention

The present invention generally relates to seed planting machines for dispensing seeds at a controlled rate into a seed furrow and, in particular, to an improved potato seed planter that is adapted to deposit individual seeds in one or more furrows with precision and at relatively high speed.

2. Description of Related Art

Seed planters of various designs have been used to dispense seeds at a controlled rate. In a typical arrangement, a tractor is coupled to a frame and one or more seed planters are attached to the frame. Each seed planter includes a hopper containing the seeds to be planted and a plow that opens a furrow or crop row in the ground. The seeds are removed from the hopper and dropped into the open furrow at a controlled rate. Conventional seed planters may also include furrow closing discs to cover the seeds with soil and an apparatus that provides fertilizer and/or insecticide as the seeds are planted.

Conventional seed planters also include rotatable wheels that contact the ground and distance monitoring devices for controlling the seed discharge rate so that proper seed spacing is achieved. Conventional seed planters, however, are very difficult to use in conjunction with potato seeds because potato seeds are relatively large, vary widely in size, and have irregular outer surfaces. Further, potato seeds can be easily bruised or damaged, and potato seed is very expensive. In contrast, conventional seed planters are typically used with seeds that have generally the same size and configuration, and the seeds are relatively small and not easily damaged.

Potato seeds are used to grow potatoes in various locations throughout the world, especially in the states of Idaho, Washington and Oregon. Typical potato crops may include hundreds or even thousands of acres, and several different types and kinds of potatoes may be grown in the same field or on the same farm. The potatoes that are grown generally have a different size depending upon the intended end use of the potatoes. For example, if the intended use of potatoes is for french fries, then it is desirable to produce the largest possible potatoes. On the other hand, if the intended use of the potatoes is for fresh produce or baking potatoes, then a smaller size is generally desired.

The dominant factor in determining the size of the potatoes in crop is the spacing of the seeds at the time of planting, unless the crop is impacted by extreme weather or other abnormal conditions. For example, a Russet Burbank potato that is planted with a nine-inch spacing between seeds and rows 36 inches apart will produce potatoes suitable for sale as fresh produce and baking potatoes. On the other hand, spacing of the same potato seed 14 inches apart and in the rows that are 36 inches apart will produce fewer, but much larger potatoes suitable for processing into french fries.

Potatoes are an expensive crop to grow because the potatoes require extensive cultivation and nurturing. Potatoes also require the use of expensive and sophisticated harvesting and handling equipment, which must be carefully designed to prevent bruising or damage to the potatoes. In addition, potato seed is very expensive because it is grown in special disease free regions and under carefully monitored conditions. Seed potatoes are generally smaller than standard production crops and, like standard potato crops, the size of the seed potato is generally determined by the spacing of the potato seeds in the field at the time of planting. Because potato seed is very expensive, it is very desirable to prevent wasting of any of the seed.

In order to decrease cost, seed potatoes are commonly cut into pieces prior to planting because all that is required for a seed is a piece of the seed potato that contains a potato eye. Disadvantageously, because the seed potatoes are cut into various shapes and sizes, potato seeds are not round and they do not have a uniform shape. Consequently, potato seed is very difficult to handle and move in a uniform manner. Thus, for example, when potato seed is loaded into a seed hopper, it does not flow or move well through the hopper. Additionally, potato seed pieces have a tendency to become interlocked or intertwined, which makes the potato seed even more difficult to handle and defeats the purpose of cutting the potato seed into pieces.

Conventional potato seed planters often have difficulties in moving the interlocked seeds and properly planting individual seeds at the desired locations. In particular, conventional potato seed planters often "skip" one or more locations where a potato seed should be planted and the planter frequently places two seeds at the same location (commonly known as a "double"). Each of these problems has significant financial consequences to the farmer because it generally costs the farmer the same amount to grow and harvest a field planted at 85% capacity or at 100% capacity. Thus, each time the planter "skips" a desired location, that directly translates into lost profits for the farmer. On the other hand, a field planted at 105% of its capacity due to "doubles" translates into an increased seed cost and lost profits for the farmer. Disadvantageously, because conventional potato planters often both "skip" and plant "doubles," this can significantly impact the number of potatoes harvested and the cost to the farmer.

Conventional potato seed planters often plant multiple rows simultaneously. For example, a conventional potato planter may plant 4, 6 or 8 rows at the same time. Conventional potato planters also include a mechanism that picks potato seeds out of the seed hopper and then drops the seeds into a furrow being plowed. These conventional potato seed planters are described in more detail below.

One type of conventional potato seed planter includes a number of picks or spikes attached to a wheel that rotates through a seed bowl. The picks impale pieces of potato seed from the seed bowl and a cam mechanism is provided to withdraw the picks from the potato seed as the wheel rotates in order to drop the potato seed into a discharge chute where it then falls to the ground.

Pick-type potato seed planters, however, suffer from significant drawbacks because if a rock enters the seed bowl, the pick cannot pick the rock up and it will "skip" each time the rock is in position to be picked up. These rocks, and other foreign matter, can easily damage or break the picks, and broken or damaged picks require expensive and time-consuming repairs. In addition, if the farmer does not know that a pick has been broken or damaged, or that a rock has entered the seed bowl, that may result in numerous skips that are very difficult, if not impossible, to subsequently correct. The picks may also impale more than one potato seed at a time and that results in a "double" being planted. Additionally, each pick has only one opportunity to impale a potato seed during each rotation of the wheel and if the potato seed is not in position to be impaled by the pick, the planter will "skip." Further, the picks and the mechanism holding the picks must be constantly adjusted and changed depending, for example, upon the type or size of the seed.

Another conventional potato planter includes a number of cups or scoops mounted on a chain or belt in which the potato seed is removed from the seed bowl by the cups or scoops. Disadvantageously, multiple seed pieces are often removed from the seed bowl by a single cup. In order to remove the extra seed pieces, a vibration unit vibrates the belt or cups in hopes of shaking the extra seed pieces out of the cup. The vibration unit, however, often fails to remove the extra seed from the cup, or it may remove all the seed from the cup. In addition, these conventional cup-type potato planters have a relatively slow speed that lowers the yield and requires additional equipment to plant a large crop. This slow speed may be particularly undesirable when the crop has a small planting window or when planting multiple crops. This cup-type conventional planter also requires constant adjustments depending upon, for example, speed of the planter and size of the seed pieces.

Another known potato seed planter includes a rotatable hub with a plurality of outwardly extending arms. A cup is attached to the outer end of each arm and a vacuum is associated with each cup to secure a seed within the cup. Thus, as the cup is rotated through a portion of the seed hopper, the vacuum is used to hold a seed within the cup. At a designated point, the vacuum is eliminated and the seed is released so that it can pass through a chute and into a furrow in the soil. Disadvantageously, the vacuum-type planter also picks up rocks, dirt, debris or other foreign matter that decreases the vacuum pressure or plugs the vacuum tubes. Consequently, the vacuum tubes must be frequently cleaned to remove the debris. Undesirably, the vacuum-type planter also has a tendency to remove the protective coating or otherwise damage the potato seed. The vacuum-type planter also requires extra horsepower and fuel to run the vacuum pump, and it increases the weight and complexity of the potato planter.

SUMMARY OF THE INVENTION

A need therefore exists for an improved potato seed planter that eliminates the above-described disadvantages and problems. While the improved planter is desirably used in connection with potatoes, it can also be used in conjunction with other types of seeds, bulbs, onions and the like.

One aspect of the present invention is a potato seed planter that includes a circulating planting unit with a plurality of cups attached to a belt or chain for delivering individual seeds to a crop row or furrow. Advantageously, the potato seed planter deposits the seeds in the furrow in a single file, straight line with uniform spacing between seeds. Significantly, the cups gently cradle the seeds to protect the seeds from damage.

Another aspect is a potato seed planter with a circulating planting unit for delivering individual potato seeds from a seed bowl to a crop row or furrow. Advantageously, the seed planter plants a single seed at one time in the desired position, and greatly reduces or eliminates the possibility of "skips" or "doubles." The planting unit includes a plurality of cups attached to a belt or chain, and each cup includes a receiving portion that is generally aligned with or located slightly inward of the centerline or pitch-line of the chain. The potato seed is placed within the receiving portion of the cup so that the seed is also generally aligned with or inside the pitch-line of the chain, and that helps securely hold the potato seed within the receiving portion of the cup. Significantly, the cup may also be located at an angle relative to the pitch-line of the chain such that the potato seed is held within the receiving portion of the cup, and vibration unit may be used to shake the seed into the receiving portion of the cup.

Yet another aspect is a potato seed planter in which the cups are arranged in a staggered or side-by-side relationship to the chain. One or more different types of inserts are sized and configured to be inserted into the cups. The inserts preferably have a curved inner surface to securely hold the desired size and type of seed within the cup, and an opening in the bottom surface of the insert allows foreign matter and other debris to escape. Advantageously, the inserts are preferably readily replaceable depending, for example, upon the speed at which seeds are planted or the type of seed.

A further aspect is a potato seed planter with a singulation section that removes any extra seeds from the cups. The singulation section is located in the upper portion of the planting unit and it allows any extra seeds located in the cups to fall into a return mechanism that returns the extra seeds to the seed bowl. A vibration unit may be added to the singulation section to ensure that any extra seeds are removed from the cups.

Another aspect is a potato seed planter with an appropriately sized singulation sprocket. As the cups pass around the singulation sprocket, the seed in the receiving portion of the cup stays in the cup because the seed and that portion of the cup are generally aligned or inward of the center-line of the chain. Any extra seeds, however, are displaced outwardly from the receiving portion of the cup and the centrifugal force and speed differential tends to discharge these extra seeds from the cup. A corner deflector is used to deflect these extra seeds into a return mechanism that returns the extra seeds to the seed bowl. Thus, any extra seeds in the cups are recycled and not wasted.

A further aspect is a potato seed planter that plants seeds in one or more furrows at a higher ground speed than conventional potato seed planters. Significantly, the higher speed planter increases yield by allowing a larger area to be planted in less time. This saves labor costs and allows a larger crop to be planted within a smaller time window.

Still another aspect is a potato seed planter in which seeds are loaded into a seed bowl or hopper and a planting unit takes individual seeds from the seed bowl. The planting unit includes an endless chain that moves upwardly between a lower sprocket and an upper sprocket. While the chain moves upwardly between these sprockets, the cups attached to the chain move upwardly through a portion of the bowl for the loading of individual potato seeds into the cups. As the chain passes around the upper sprocket, the chain travels through a singulation section to allow for the removal of any extra seeds from the cups. The chain then passes over a third sprocket and returns to the first, lower sprocket. As the chain passes over the third sprocket, each cup is inverted and the seed falls downwardly until it reaches the bottom surface of the immediately preceding inverted cup. A guide structure ensures that each seed is correctly guided onto the bottom surface of the preceding cup. As the seed approaches the ground, the individual seeds are guided into a discharge unit that drops the seeds into the desired positions in the furrow.

Advantageously, the potato seed planter accurately and precisely positions each potato seed to maximize yield and profits to the farmer because there are no or very few skips or unplanted areas in the crop. Significantly, the potato seed planter also minimizes doubles and, because it has relatively few moving parts, it is easy to repair and maintain. In addition, the potato seed planter is very rugged, reliable, and operator friendly.

Further aspects, features and advantages of the present invention will become apparent from the detailed description of the preferred embodiments that follows.

BRIEF DESCRIPTION OF THE DRAWINGS

The appended drawings contain figures of preferred embodiments of the improved potato seed planter. The above-mentioned features of the potato seed planter, as well as other features, will be described in connection with the preferred embodiments. The illustrated embodiments, however, are only intended to illustrate the invention and not limit the invention. The drawings contain the following figures.

DETAILED DESCRIPTION OF THE PREFERRED EMBODIMENTS

The present invention involves an improved potato seed planter. The principles of the present invention, however, are not limited to potato seed planters. It will be understood that, in light of the present disclosure, the seed planter disclosed herein can be successfully used in connection with other types of seeds, bulbs, onions, flowers, and the like. Additionally, to assist in the description of the potato seed planter, words such as top, bottom, front, rear, right and left are used to describe the accompanying figures. It will be appreciated, however, that the present invention can be located in a variety of desired positions and angles, and that the various components can be arranged in other suitable configurations. A detailed description of the improved potato seed planter now follows.

Figure 1:
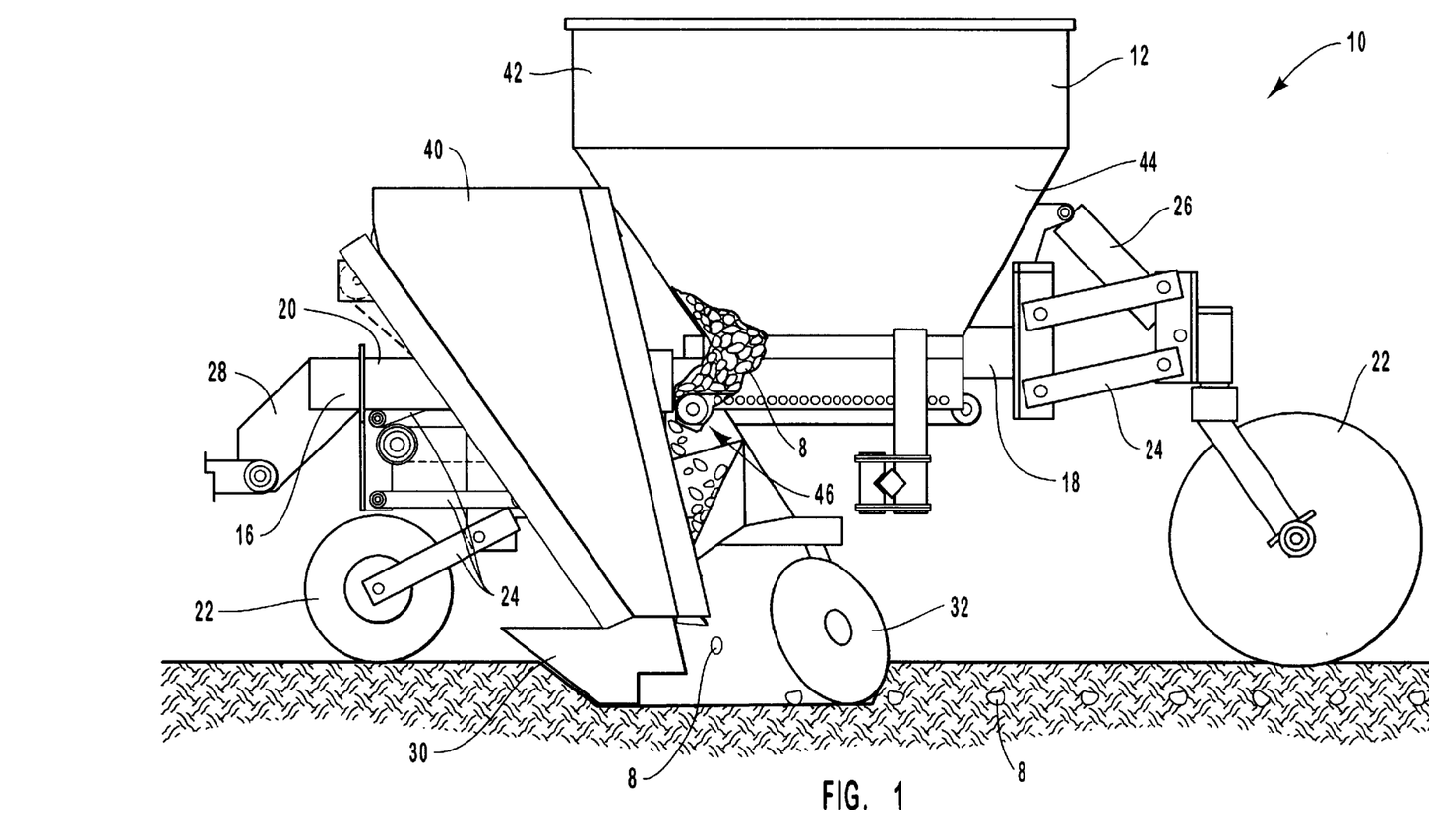
FIG. 1 is a side view of an improved potato seed planter in accordance with a preferred embodiment of the present invention.
Figure 2:
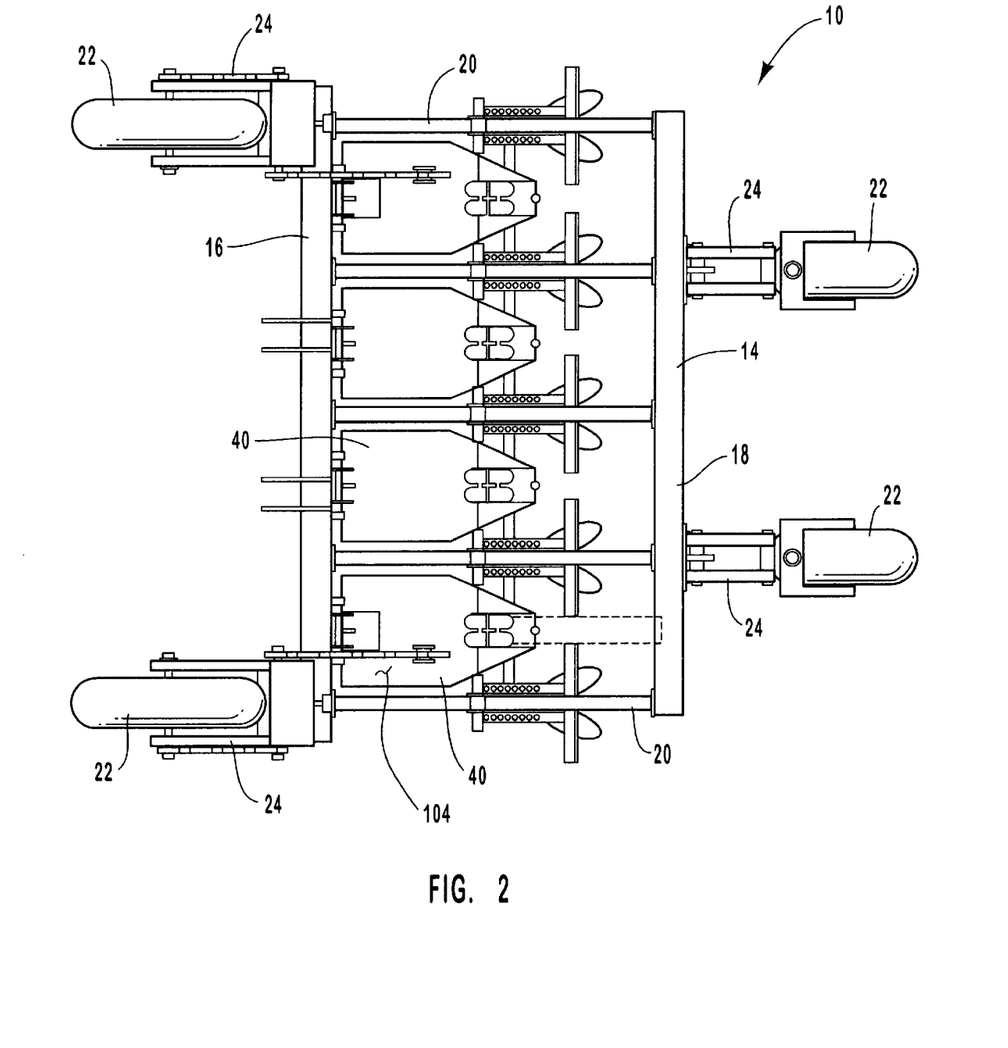
FIG. 2 is a top view of a portion of the potato seed planter shown in FIG. 1, illustrating the frame and two seed hoppers.

As best seen in FIGS. 1 and 2, the potato seed planter 10 includes a seed hopper 12 for receiving potato seeds 8, and a perimeter frame 14 including a front frame member 16, rear frame member 18 and a plurality of frame struts 20 interconnecting the front and rear frame members. A plurality of wheels 22 are attached to the frame, such as transport wheels and gage wheels, and various links 24 are used to attach the wheels to the frame 14. The wheels are used to drive the potato seed planter 10 and transport the planter to and from the fields to be planted. The wheels 22 are preferably adjustably attached to the frame 14 and some or all of the wheels may be attached to the frame by swivel support arms.

The potato seed planter 10 also includes a hydraulic system 26 for raising the height of the planter for transport and lowering the planter for use. One skilled in the art will appreciate that the height of the potato seed planter 10 may also be adjusted, for example, manually by means such as a hand crank. The potato seed planter 10 also includes a hitch link 28 for connecting the potato seed planter to a tractor, a plow or furrow opener 30 for creating the furrow, and a furrow closing disc 32 for covering the seeds with soil. It will be appreciated that the furrow opener 30 and furrow closer 32 are adjustable to create furrows of the desired size, spacing, depth, and the like.

The potato seed planter 10 is designed to be pulled behind a tractor (not shown), and the tractor preferably provides power to the planter. As known in the art, tractors typically provide hydraulic or mechanical power to a towed device such as a planter. The potato seed planter 10 can be powered by either hydraulic or mechanical power from the tractor, or it can be powered from any suitable source, including being self-powered.

As best seen in FIG. 1, a planting unit 40 is attached to the frame 14 between the hitch link 28 and the seed hopper 12. The planting unit 40 dispenses individual potato seeds supplied by the seed hopper 12 into a furrow created by the furrower opener 30 at a controlled rate. The potato seed planter 10 may include any suitable number of planting units 40 and associated components to plant multiple rows at one time. Thus, although the accompanying figures illustrate the potato seed planter 10 as a four-row planter, it can plant any desirable number of rows such as two, six or eight. Additionally, as discussed above, the power for the planting unit 40 can be derived from a hydraulic system of the towing tractor, an individual hydraulic motor, mechanically from the power take off of the towing tractor, an independent traveler wheel or other suitable source. One skilled in the art will understand that while the preferred embodiments of the potato seed planter 10 illustrate the various components of the planter in specific locations, these components may be arranged in any suitable locations and configurations.

Figure 3:
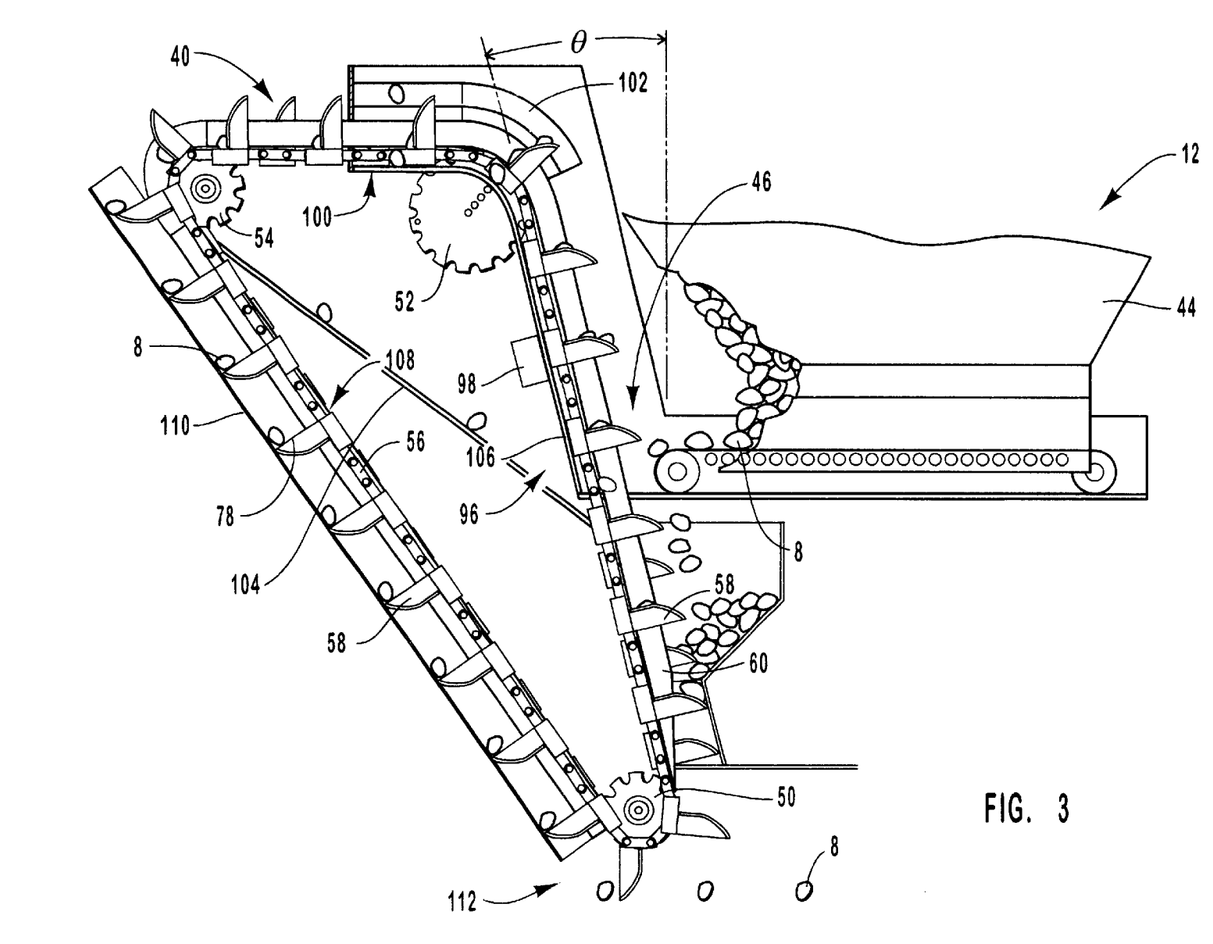
FIG. 3 is a side view of a portion of the potato seed planter shown in FIG. 1, illustrating a portion of the seed hopper and a planting unit.

As best seen in FIGS. 1 and 2, the seed hoppers 12 are sized and configured to receive numerous potato seeds 8 that are to be planted. The seed hopper 12 includes generally upright upper walls 42 and angled lower walls 44, and the seed hopper may also contain baffles and/or a shaker plate (not shown) with a cam or other mechanism to agitate the seeds and/or a conveyor to carry the seed from the hopper to a planting bowl 45. The baffles and shaker plate are used to keep the pieces of potato seed separated and agitated, but they are not required. As best seen in FIGS. 1 and 3, the seed hopper 12 includes an opening 46 proximate the planting unit 40 for providing seeds to the planting bowl 45.

As seen in FIG. 1, the furrow opener 30 is preferably configured such that the seed 8 is delivered to the furrow directly, without contact with any part of the opener 30 between the release and soil contact.

Figure 4:
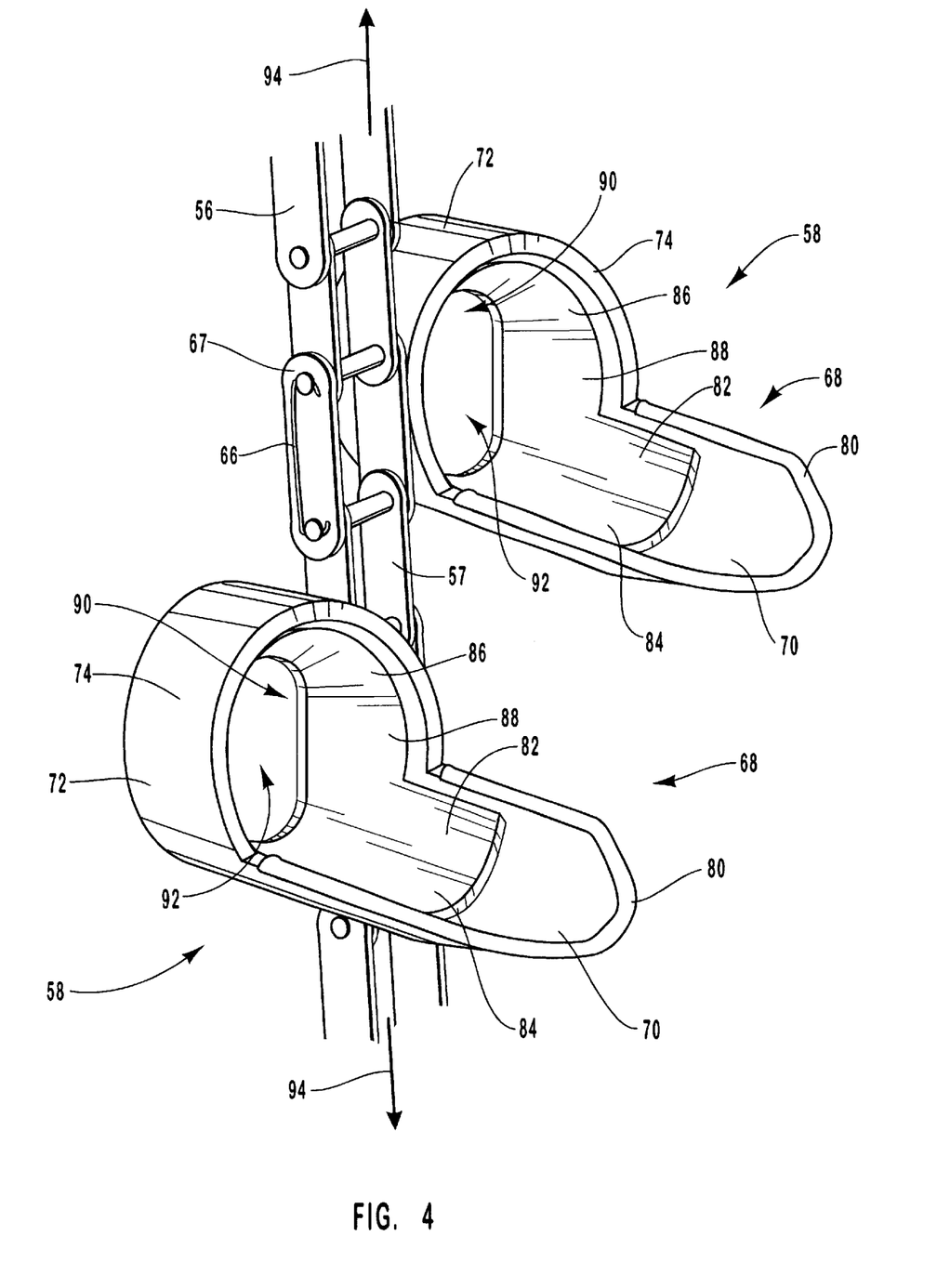
FIG. 4 is a perspective view of a portion of the planting unit shown in FIG. 2, illustrating two cups attached to a chain.

As seen in FIG. 3, the planting unit 40 includes a circulating planting mechanism that is used to plant individual potato seeds 8 in the ground at the desired locations. The planting unit 40 includes three sprockets 48, gears, wheels, rotatable hubs or the like. The three sprockets 48 include a first lower sprocket 50, a second upper sprocket 52 and a third return sprocket 54. The sprockets 48 are connected by an endless or continuous chain or belt 56. A plurality of cups, scoops or buckets 58 are attached to the chain. Preferably, as seen in FIG. 4, the cups 58 are attached to both sides of the chain 56 and in a staggered configuration to increase the number of seeds that can be planted. The planting unit 40 may also include two chains 56 with the cups 58 attached on opposite sides of the chains. The two chains 56 preferably travel at the same speed and the cups 58 are equally spaced apart such that the seeds are equally spaced apart. As seen in FIG. 3, a divider 60 may be used to separate the cups 58 attached to either side of a single chain 56, or opposing sides of dual chains. One skilled in the art will readily appreciate that the cups 58, chains 56 and sprockets 48 may have other suitable configurations and arrangements depending upon, for example, the desired seeds to be planted and spacing of the seeds.

Figure 5:
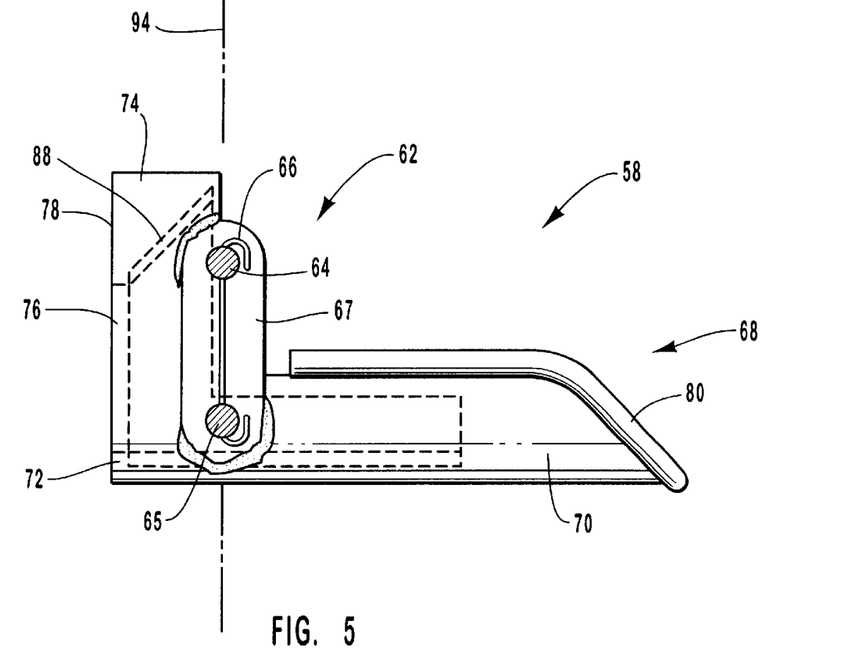
FIG. 5 is a side view of one of the cups shown in FIG. 4.
Figure 6:
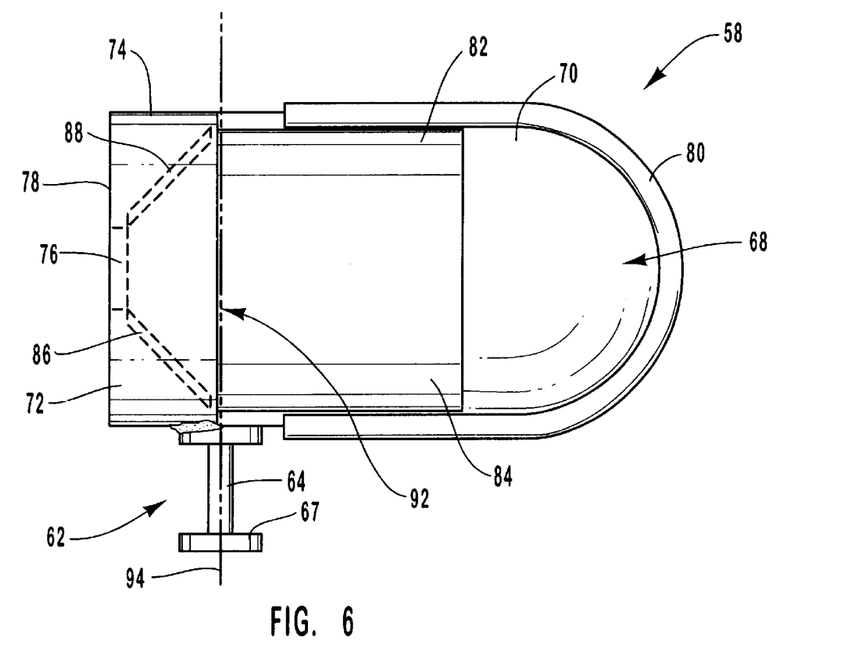
FIG. 6 is a front view of the cup shown in FIG. 5.

The cups 58, as best seen in FIGS. 4–6, are preferably releasably attached to the chain 56 so that the cups are readily replaceable and repairable. Additionally, this allows one or more of the cups 58 may be replaced with cups of different sizes and configurations. In greater detail, the cups 58 include an attachment mechanism 62 that is used to attach the cups to the chain 56. The attachment mechanism 62 includes two elongated members 64 and 65 that are connected to one or more chain links 57. Preferably, the elongated member 64 and 65 are used to connect the chain links 57, but the elongated members may also be simply attached to the chain 56. A pin 66 is preferably used to releasably connect the elongated members 64, 65 to the chain 56 and a connecting member 67 may be used to position the elongated members in the desired positions. One skilled in the art will readily appreciate that other known means may be used to connect the cups 58 to the chain 56.

As best seen in FIGS. 4–6, the cups 58 have an open front 68 and an elongated sidewall 70. The elongated sidewall 70 is curved and preferably extends less than half way around the base 72 of the cup 58. The base 72 includes a generally circular sidewall 74 and an opening 76 is formed in the bottom surface 78 of the base. The opening 76 in the base 72 desirably allows foreign matter and other debris to be released from the cup 58. The upper surfaces of the generally circular sidewall 74 of the cup 58 are preferably slightly rounded or beveled, and the outer surface of the elongated sidewall 70 preferably has a relatively large radius of curvature 80 to help prevent the potato seeds 8 from being damaged as the seeds are removed from the seed bowl 45. The curved upper surface 80 may be created, for example, be welding a wire or other generally circular member to the outer surface of the elongated sidewall 70. The cup 58 is preferably constructed from a durable material such as steel, but other types of metals, plastics, synthetics, etc. with suitable characteristics may be used.

Inserts 82 are releasably and adjustably attached to the inner surface of the cup 58 by one or more threaded fasteners (not shown) or snap together construction. The inserts 82 allow seeds of different types and configurations, for example, to be held within the cups 58. In addition, the adjustable inserts 82 allow the seeds to be positioned within different portions of the cups 58 depending, for example, upon the desired speed of the potato seed planter 10. The inserts 82 include an elongated sidewall 84 that is sized and configured to fit within the inner surface of the elongated side 70 of the cup 58. The insert 82 also includes a base 86 with inclined sides 88 and an opening 90 that is preferably generally aligned with the opening 76 in the bottom surface 78 of the base 72. Advantageously, the insert 82 is readily adjustable and allows the seed to be properly positioned within the cup 58. Alternatively, the entire cup 58 may be substituted with another cup of suitable size instead of using an insert.

As best seen in FIG. 4, the base 86, inclined sidewall 88 and opening 90 in the insert 82 form a receiving portion 92 that is sized and configured to receive and hold a potato seed in a desired location. The receiving portion 92 is located proximate the intersection of the base 72 and elongated sidewall 70 of the cup 58, but the receiving portion could be located in any desired portion of the cup. The receiving portion 92 is preferably sized and configured to receive a single potato seed and, as discussed below, to allow any extra potato seeds to be easily removed. The inclined wall 88 may be positioned at any suitable angle with respect to the base 72 of the cup 58, and the angle of the inclined wall may vary relative to the perimeter of the base. Preferably the elongated sidewall 70 is the closing portion of the insert 82, which makes the insert 82 somewhat U-shaped.

As seen in FIGS. 4–7, the receiving portion 92 is positioned proximate a centerline 94 of the chain 56. Preferably, at least a portion of the receiving portion 92 is generally aligned with the centerline 94 of the chain 56, or positioned inwardly of the centerline of the chain as the chain circulates within the planting unit 40. Additionally, the cup 58 is preferably attached to the chain 56 at an angle such that the elongated sidewall 70 is positioned at an angle, such as about a 10°, with respect to the centerline 94 of the chain. By positioning the cup 58 at an angle with respect to the chain 56, that tends to cause the potato seed to be located within the receiving portion 92. It will be appreciated, however, that the cup 58 may be positioned at any desired angle with respect to the chain 56 and that the cups do not require the use of the inserts 82.

As best seen in FIG. 3, the sprockets 48 and the chain 56 of the planting unit 40 have a generally triangular shaped configuration. The configuration of the planting unit 40, however, is not limited to three sprockets and it could have four or more sprockets. In greater detail, the planting unit 40 includes a first loading section 96 disposed between the first sprocket 50 and the second sprocket 52. The loading section 96 is positioned at an angle θ and between about 5° and about 45°, more preferably about 15°, with respect to vertical. The loading section 96 is positioned at the angle θ so that the potato seeds are desirably positioned within the receiving portion 92 of the cups 58.

The cups 58 are filled with seed as the cups move upwardly through the bowl 45, which is supplied with seed from seed hopper 12. A vibration unit 98 may be used to shake the chain 56 and/or cups 58 so that the individual seeds settle into the receiving portion 92 of the cup 58. The vibration unit 98, however, is not required and its use may be determined by the planting conditions, types of seeds, etc. Additionally, the cups 58 are attached at an angle relative to the centerline 94 of the chain 56 to help hold the seed securely within the receiving portion 92 of the cup. Further, because the receiving portion 92 is generally aligned with or inward of the center-line or pitch line 94 of the chain the force provided on the seed by the upwardly moving cup tends to retain the seed within the receiving portion of the cup. Thus, the vibration unit, angled cup and placement of the receiving portion 92 tends to prevent the seed from being unintentionally discharged from the cup.

The cup 58 then travels around the singulation sprocket 52 and into a singulation section 100 disposed between the singulation sprocket and the return sprocket 54. The singulation sprocket 52 has a diameter appropriate to planting conditions, such as seed size, planting speed, etc., so that the desired single potato seed tends to remain within the receiving portion 92 of the cup 58. Additionally, the sprocket 52 creates a larger centrifugal force the greater the distance from the center of rotation of the sprocket. This centrifugal force acts upon any extra seeds that are disposed outwardly from the receiving portion 92 of the cup.

In particular, as discussed above, the desired single potato seed is held within the bottom portion of the cup 58 in the receiving position 92, and the potato seed is generally in-line or inward of the centerline of the chain such that movement of the chain tends to keep the seed within the receiving portion 92 of the cup. Any extra seeds, however, are disposed outwardly and away from the receiving portion 92 of the cup 58, and the extra seeds are not aligned or inward of the centerline 94 of the chain 56. The extra seeds tend to be thrown out of the cups 58 because of the centrifugal force as the cup 58 rounds the singulation sprocket 52. It will be appreciated that the diameter of the sprocket 52 may vary, for example, upon the speed of the potato seed planter 10 or size of the seeds so that any extra seeds are removed by the centrifugal force.

In addition, as the cup 58 travels around the singulation sprocket 52, the extra seed (located in the portion of the cup farthest from the chain 56) is accelerated because it travels a greater distance than the chain 56, while the desired single potato seed remains in the receiving portion 92 traveling at the same speed as the chain, or less if the receiving portion is located inside the center line 94 of the chain. As the cup 58 exits from the singulation sprocket 52, the single potato seed located in the receiving portion 92 continues to travel at approximately the same speed as the chain 56, and the extra seed located in the farthest portion of the cup generally continues traveling at this faster speed. Once the extra seed is no longer supported by the desired single potato seed or a portion of the cup 58, the extra seed falls between its original cup and the preceding cup, and into a return mechanism 104.

Figure 7:
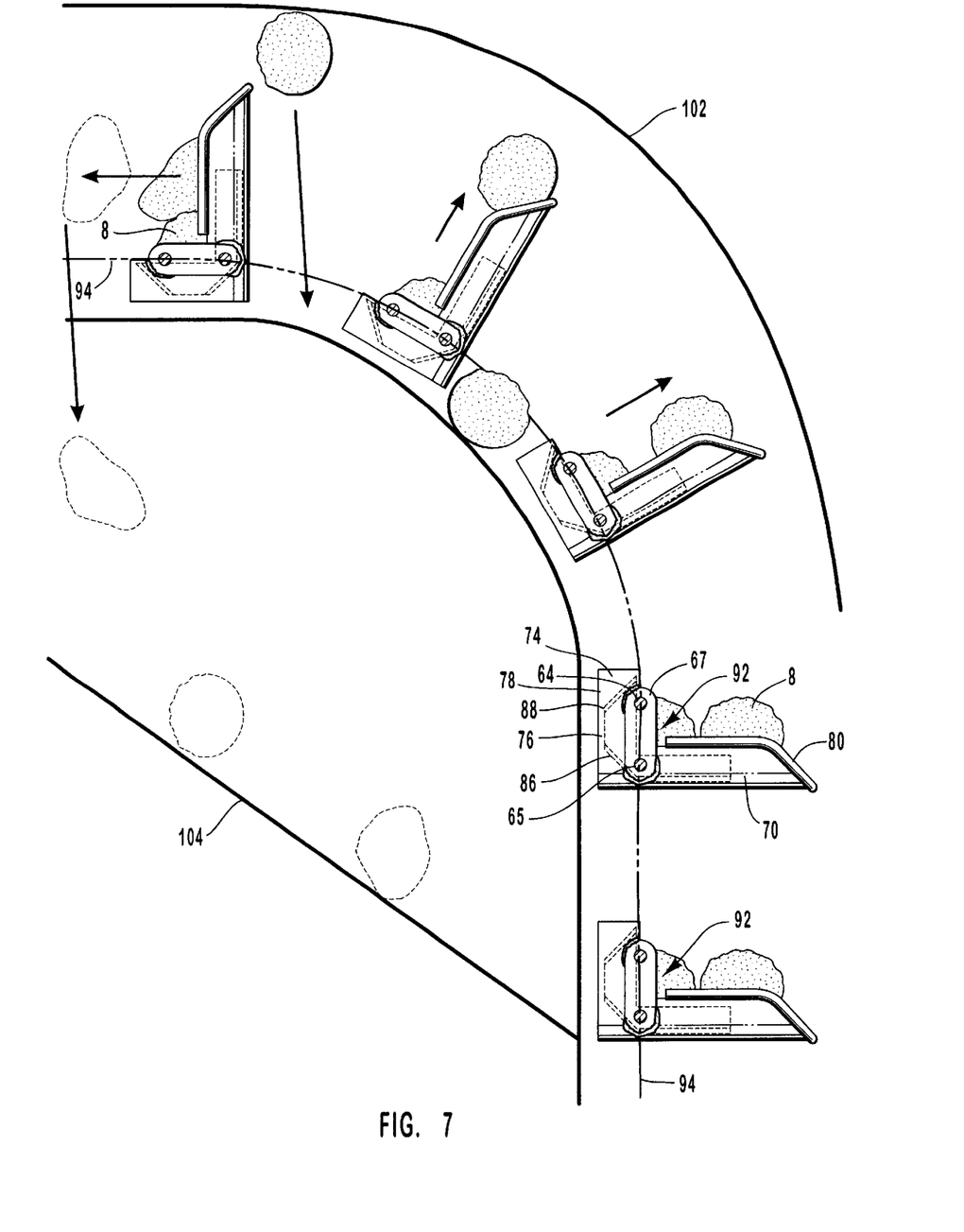
FIG. 7 is a side view of a portion of the planting unit shown in FIG. 2 illustrating a portion of the chain traversing the upper singulation sprocket.
Figure 8:
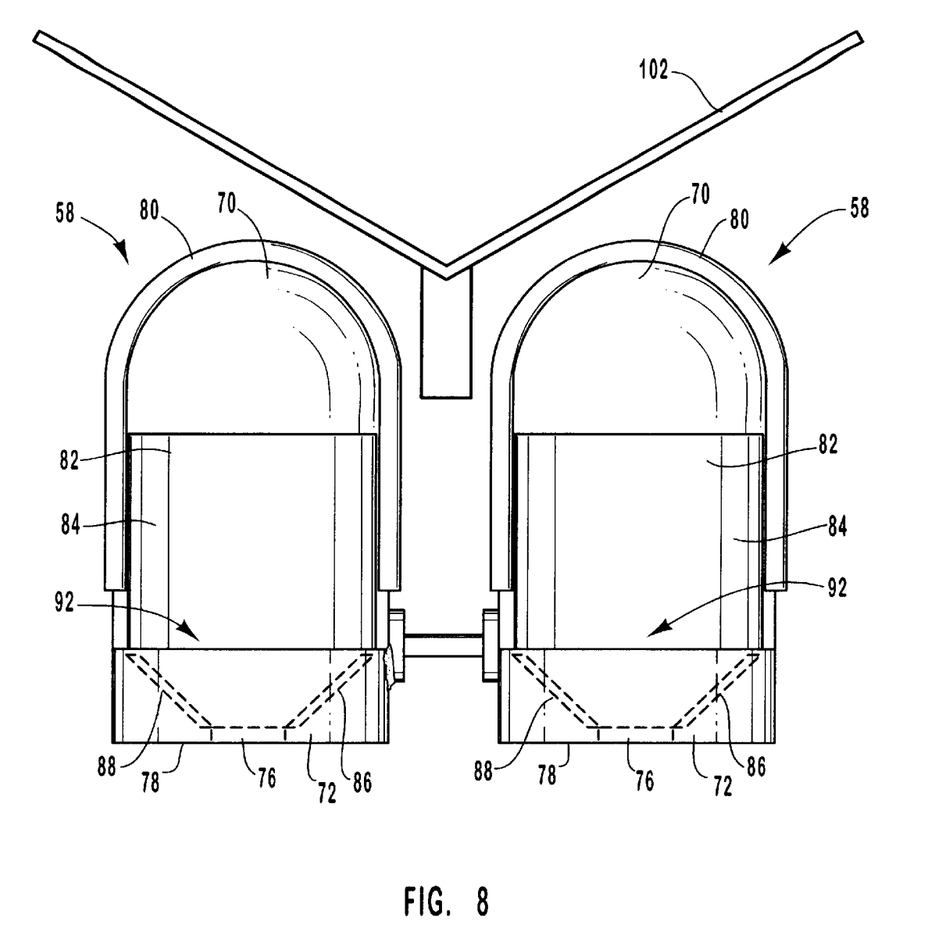
FIG. 8 is a front view of a portion of the planting unit shown in FIG. 2, illustrating a deflector located near the upper singulation sprocket.

As seen in FIGS. 3, 7 and 8, a corner deflector 102 may be used to guide the extra seeds that are ejected from the cups to the return mechanism 104. The return mechanism 104 includes a plate that extends outwardly to receive the extra seed pieces and it guides the extra seed pieces back to the seed bowl 45 so that the seed is not wasted. In greater detail, the corner deflector 102 has a generally V-shaped configuration that deflects the extra seeds outwardly and into the return mechanism 104. The return mechanism 104 is preferably located on both sides of the chain 56 and it includes one or more plates or walls 106 that guide the extra seeds back to the seed bowl 45.

In addition, the singulation section 100 is generally horizontal to allow any extra seeds that were not removed by the centrifugal force to fall out of the cup 58 because of gravity. In particular, the desired single potato seed is held within the receiving portion 92 of the cup 58 and, because the receiving portion is generally in-line or inward of the pitch-line of the chain 56, the force of the moving chain tends to keep the seed within the receiving portion. Any extra seed within the cup 56, however, is not held within the receiving portion 92 and the sideless portion of the cup allows the seed to fall out and into the return mechanism 104. A vibration unit or other similar apparatus (not shown) may be used to help shake any extra seeds out of the cup and into the return mechanism 104.

As seen in FIG. 3, the cup 58 with the single potato seed traverses the return sprocket 54 and enters the downward section 108 located between the return sprocket and the first sprocket 54. As the cup 58 traverses the return sprocket 54, the cup is inverted and it travels downwardly. The seed falls out of the cup 58 because of gravity and a guide mechanism 110 ensures that falling seed lands on the back surface of elongated sidewall 70 of the next forwardly adjacent cup. Thus, the guide mechanism 110 and the back surface of elongated sidewall 70 of the next forwardly adjacent cup are used to control the descent of the individual seeds. The surfaces of elongated walls 70 of the cups 58 are generally curved, but the bottom surface could also be, for example, angled, concave, etc. to receive the seed and/or retain the seed between the guide mechanism 110 and bottom surface of the cup.

The guide mechanism 110 desirably includes a rounded or contoured inner surface that ensures the seed falls gently to the back surface of elongated sidewall 70 of the immediately proceeding cup 58. Preferably, the downward section 108 and guide mechanism 110 are angled at about a 35° angle with respect to vertical so that the seeds fall relatively slowly to the next adjacent cup 58, which helps prevent bruising and damage to the seeds. It will be appreciated, however, that the downward section 108 and the guide mechanism 110 can be positioned at any suitable angle. As best seen in FIG. 3, the guide mechanism 110 has a small gap or distance between the elongated sidewall 70 of the cup 58 and the inner surface of the guide. This distance may be adjustable, but it should not be large enough to allow the seeds to fall to the ground. Accordingly, the guide structure 110 ensures that the seeds fall from the cup 58 to the back surface of elongated sidewall 70 of the next adjacent cup in a controlled manner such that the seeds are not damaged or bruised.

The guide mechanism 110 is preferably made from or lined with a self-cleaning or non-stick coating such as ultra high molecular weight polyethylene or other suitable material. This insures that the seed 8 slides, rather than tumbles as it descends. It also assures that each seed 8 is delivered in a generally stable, non-rotating motion, which advantageously reduces the roll of the seed in the furrow.

A discharge unit 112 is attached to the end of the guide mechanism and it includes a tube or chute that drops the seeds into the furrow in the soil created by the furrow opener 30. The discharge unit 112 receives seeds from the cups 58 attached to both sides of the chain 56 and it ensures that the seeds are dropped in a generally straight line in the furrow. Preferably, the discharge unit 112 is positioned near the ground such that the seeds have a relatively short distance to drop into the furrow and the seeds generally do not roll. This helps preserve the uniform spacing of the seeds. Alternatively, the discharge unit 112 may be omitted, in which case the seed is released directly to the furrow from the guide structure 110.

In operation, the potato seed planter 10 is attached to a tractor (not shown) by the hitch link 28 and it is transported to the field for planting on the wheels 22. The hydraulic system 26 is used to position the potato seed planter 10 at the desired height and the seed hopper 12 is filled with the desired type and amount of seed 8. As the tractor pulls the planter, the desired wheels 22 engage the ground, and the chain 56 and cups 58 of the planting unit 40 circulate. As the cups 58 travel upwardly through the seed bowl 45 and, because of their staggered positions relative to one another in their respective rows on the chain, the cups enter the loading section of the seed bowl alternately by row rather than in rapid sequence. Advantageously, this tends to agitate the seeds 8 and prevents the seeds from becoming interconnected or intertwined.

A single seed 8 is typically received within each cup 58 and, as the loaded cups travel upwardly on the chain 56, the vibration unit 98 shakes the seed into the receiving portion 92 of the cup. The cups 58 then travel or circulate around the upper, singulation sprocket 52 where any extra seeds in the cups are removed by the centrifugal force and/or differential velocity and returned to the seed bowl 45 by the return mechanism 104. The extra seeds may also fall out of the cups 58 because of gravity as the cups pass through the singulation section 100. The cups 58 then travel around the third sprocket 54 where the cups are inverted. The seed 8 is discharged from the inverted cup 58 and it falls until it reaches the back surface of the elongated sidewall 70 of immediately preceding cup. The guide structure 110 controls the movement of the seeds 8 and ensures that the seeds contact the back surface of the elongated sidewall 70 of the immediately preceding cup 58. The guide structure 110 also helps minimize bruising, cutting or other damage to the seeds 8. The seeds 8 are supported on the back of the elongated sidewall 70 of the preceding cup 58 and/or the guide mechanism 110 until the seeds reach the discharge unit 112, which discharges the seeds into the groove in the center of the furrow.

It will be appreciated that planting operations are often carried out in fields in which the ground is uneven. Advantageously, the potato seed planter 10 allows potato seeds 8 to be precisely planted on either level or uneven ground because, among other reasons, the seed planting units 40 are individually attached to the frame 14 and supported by gage wheels 22. In addition, the height of the frame and planting units are readily adjustable, and the height of the frame relative to the tractor may also be adjustable.

One skilled in the art will also appreciate that the potato seed planter 10 can be equipped to include various accessories and appliances which permit other operations to be performed while the potato seeds 8 are being planted. For example, fertilizer materials can be dispensed from containers or other dispensing devices to distribute fertilizer directly to the furrows. In addition, other known devices can be attached to the frame of the potato seed planter, such as a device that provides insecticide to the furrows or crop rows.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A seed planter for planting seeds in the ground at desired locations, the seed planter comprising:
    a frame;
    a seed hopper attached to the frame, the seed hopper being sized and configured to receive a plurality of seeds; and
    a planting unit attached to the frame, the planting unit comprising:
       an endless chain passing around a first sprocket, a second sprocket and a third sprocket, the chain including a pitch line and a plurality of links;
       a plurality of cups attached to the endless chain, each cup of the plurality of cups including a receiving portion adapted to receive an individual seed, the receiving portion being generally aligned with or inward of the pitch line of the chain;
       a loading section disposed between the first sprocket and the second sprocket, the loading section allowing seeds from the seed hopper to be loaded into the plurality of cups attached to the endless chain;
       a singulation section disposed proximate the second sprocket that removes any extra seeds from the plurality of cups;
       a downward section disposed between the second sprocket and the third sprocket; and
       a guide mechanism disposed proximate the downward section, the guide mechanism being adapted to guide the movement of the potato seeds in the downward section.

2. The seed planter of claim 1, further comprising an adjustable insert sized and configured to be mounted to each cup, the adjustable insert being adapted to adjustably position the receiving portion within each cup.

3. The seed planter of claim 1, further comprising a return mechanism that returns any extra seeds loaded into the plurality of cups to the seed bowl.

4. The seed planter of claim 3, further comprising a deflector positioned proximate the second sprocket, the deflector being sized and configured to deflect any extra seeds discharged from the plurality of cups into the return mechanism.

5. The seed planter of claim 1, further comprising a vibration unit proximate the loading section, the vibration unit being adapted to vibrate the seeds into the receiving portion.

6. The seed planter of claim 1, wherein a first seed is received in the receiving portion of the cup and any extra seeds are displaced outwardly from the receiving portion of the cup, and wherein the extra seeds are discharged from the cup as the cup traverses the second sprocket.

7. The seed planter of claim 6, wherein the extra seeds are discharged from the cup by a centrifugal force.

8. The seed planter of claim 1, wherein the extra seeds are discharged from the cup by a differential velocity.

9. The seed planter of claim 1, wherein the chain travels in a generally upward direction between the first sprocket and the second sprocket, wherein the chain travels in a generally horizontal direction between the second sprocket and the third sprocket, and wherein the chain travels in a generally downward direction between the third sprocket and the first sprocket.

10. A planting unit for a potato seed planter, the planting unit comprising:
    a first sprocket;
    a second sprocket;
    a third sprocket;
    a flexible band disposed about the first sprocket, the second sprocket and the third sprocket, the flexible band having an outer surface, an inner surface and a centerline;
    a plurality of cups attached to the flexible band, each cup of the plurality of cups including a receiving portion adapted to receive a potato seed, the receiving portion being generally aligned with or inward of the centerline of the flexible band;
    a loading section disposed between the first sprocket and the second sprocket, the loading section allowing potato seeds to be loaded into the plurality of cups attached to the flexible band; and
    a singulation section disposed proximate the second sprocket that removes any extra potato seeds from the plurality of cups.

11. The planting unit of claim 10, wherein the flexible band is a chain with a plurality of links.

12. The planting unit of claim 10, wherein the receiving portion of each cup receives an individual potato seed and any extra potato seeds are displaced outwardly from the receiving portion of the cup, and wherein the extra potato seeds are discharged from the cup in the singulation section.

13. The planting unit of claim 12, wherein the extra seeds are discharged from the cup by a centrifugal force.

14. The planting unit of claim 12, wherein the extra seeds are discharged from the cup by a differential velocity.

15. The planting unit of claim 10, wherein the extra seeds are discharged from the cup by a vibration unit located in the singulation section.

16. The planting unit of claim 10, further comprising a downward section disposed between the second sprocket and the third sprocket.

17. The planting unit of claim 16, further comprising a guide mechanism disposed proximate the downward section, the guide mechanism being adapted to help guide the movement of the potato seeds in the downward section.

18. The planting unit of claim 10, further comprising an adjustable insert that is sized and configured to be attached to the plurality of cups.

19. The planting unit of claim 10, further comprising a return mechanism that returns any extra seeds discharged from the plurality of cups to a seed bowl.

20. The planting unit of claim 19, further comprising a deflector positioned proximate the second sprocket, the deflector being sized and configured to deflect the extra seeds discharged from the plurality of cups to the return mechanism.

21. The planting unit of claim 10, wherein the plurality of cups are attached to the flexible band at an angle such that potato seed tends to be received within the receiving portion of each cup.

22. The planting unit of claim 10, wherein the loading section is disposed at an angle such that potato seed tends to be received within the receiving portion of each cup.

23. The planting unit of claim 10, further comprising a vibration unit positioned proximate the loading section, the vibration unit being adapted to shake a potato seed into the receiving portion of the cup.

24. A planting unit for a potato seed planter, the planting unit comprising:
a rotatable first sprocket;
a rotatable second sprocket;
a rotatable third sprocket;
a chain engaging the first sprocket, the second sprocket and the third sprocket, the chain adapted to travel in a generally upward direction between the first sprocket and the second sprocket, the chain adapted to travel in a generally horizontal direction between the second sprocket and the third sprocket, and the chain being adapted to travel in a generally downward direction between the third sprocket and the first sprocket; and
a plurality of cups attached to the chain, each of the cups including a receiving portion that is generally aligned with or inward of a pitch line of the chain.

25. The planting unit of claim 24, wherein potato seed is loaded into the receiving portion of each cup between the first sprocket and the second sprocket.

26. The planting unit of claim 23, wherein if more than one potato seed is loaded into each cup, the potato seed loaded into the receiving portion of the cup stays within the cup and the extra potato seed is discharged from the cup after the cup traverses the second sprocket.

27. The planting unit of claim 24, wherein the potato seed loaded in the receiving portion of the cup generally stays within the receiving portion of the cup because it is generally aligned with or inward of the pitch line of the chain and it travels at generally the same velocity as the chain.

28. The planting unit of claim 24, wherein any extra potato seed loaded into the cup is displaced outwardly from the receiving portion of the cup, and wherein the extra potato seed is discharged from the cup because it travels at a different velocity than the chain after the cup traverses the second sprocket.

29. The planting unit of claim 24, wherein the plurality of cups are attached to the chain at an angle such that the potato seed tends to be received within the receiving portion of the cup.

30. The planting unit of claim 24, further comprising one or more inserts that can be attached to the plurality of cups, the inserts being adapted to hold potato seed in the desired position.

31. The planting unit of claim 30, wherein the inserts are adjustable to adjust the location of the receiving portion within the cup.

32. The planting unit of claim 24, further comprising a return mechanism that returns extra seed to the seed bowl.

33. The planting unit of claim 32, further comprising a deflector positioned proximate the second sprocket, the deflector being sized and configured to deflect the extra seed to the return mechanism.

34. The planting unit of claim 24, further comprising a vibration unit positioned between the first sprocket and the second sprocket, the vibration unit being adapted to shake the seed into the receiving portion of the cup.

35. The planting unit of claim 24, further comprising a vibration unit positioned between the second sprocket and the third sprocket, the vibration unit being adapted to shake any extra seeds out of the plurality of cups.

36. The planting unit of claim 24, wherein when each cup traverses the third sprocket, the cup is inverted and the seed falls downwardly until in contacts the bottom surface of the next preceding cup.

37. The planting unit of claim 24, further comprising a guide mechanism positioned between the third sprocket and the first sprocket, the guide mechanism being adapted to guide the seed as it moves between the third sprocket and the first sprocket.

38. A seed planter for planting seeds in the ground at desired locations, the seed planter comprising:
a frame;
a seed hopper attached to the frame, the seed hopper being sized and configured to receive a plurality of seeds; and
a planting unit attached to the frame, the planting unit comprising:
an endless chain passing around a first sprocket, a second sprocket and a third sprocket, the chain including a pitch line and a plurality of links;
a plurality of cups attached to the endless chain, each cup of the plurality of cups including a receiving portion adapted to receive a seed and an outer tip;
a loading section disposed between the first sprocket and the second sprocket, the loading section allowing seeds from the seed hopper to be loaded into the plurality of cups attached to the endless chain;
a deflector positioned proximate the second sprocket and outer tip of the plurality of cups, the deflector being sized and configured to deflect any extra seeds discharged from the plurality of cups into a return mechanism;
a downward section disposed between the second sprocket and the third sprocket; and
a guide mechanism disposed proximate the downward section, the guide mechanism being adapted to guide the movement of the potato seeds in the downward section.

39. The seed planter of claim 38, wherein the receiving portion is generally aligned with or inward of the pitch line of the chain.

40. The seed planter of claim 38, further comprising a vibration unit proximate the loading section, the vibration unit being adapted to vibrate the seeds into the receiving portion.

41. The seed planter of claim 38, wherein the any extra seeds are discharged from the plurality of cups by a centrifugal force.

42. The seed planter of claim 38, wherein the any extra seeds are discharged from the plurality of cups by a difference in velocity between the extra seeds and the chain.

43. A planting unit for a potato seed planter, the planting unit comprising:

a first sprocket;

a second sprocket;

a third sprocket;

a flexible band disposed about the first sprocket, the second sprocket and the third sprocket, the flexible band having an outer surface, an inner surface and a centerline;

a plurality of cups attached to the flexible band, each cup of the plurality of cups including a receiving portion adapted to receive a potato seed and an outer tip;

a loading section disposed between the first sprocket and the second sprocket, the loading section allowing potato seeds to be loaded into the plurality of cups attached to the flexible band; and a deflector positioned proximate the second sprocket and outer tip of the plurality of cups, the deflector being sized and configured to deflect any extra seeds discharged from the plurality of cups into a return mechanism.

44. The planting unit of claim 43, wherein the receiving portion is generally aligned with or inward of the centerline of the flexible band.

45. The planting unit of claim 43, wherein the plurality of cups are attached to the flexible band at an angle such that a potato seed tends to be received within the receiving portion of each cup.

46. The planting unit of claim 43, wherein the loading section is disposed at an angle such that a potato seed tends to be received within the receiving portion of each cup.

47. The planting unit of claim 43, further comprising a vibration unit positioned proximate the loading section, the vibration unit being adapted to shake a potato seed into the receiving portion of each cup.

48. A planting unit for a potato seed planter, the planting unit comprising:

a rotatable first sprocket;

a rotatable second sprocket;

a rotatable third sprocket;

a chain engaging the first sprocket, the second sprocket and the third sprocket, the chain adapted to travel in a generally upward direction between the first sprocket and the second sprocket, the chain adapted to travel in a generally horizontal direction between the second sprocket and the third sprocket, and the chain being adapted to travel in a generally downward direction between the third sprocket and the first sprocket;

a plurality of cups attached to the chain, each of the cups including a receiving portion and an outer tip; and a deflector positioned proximate the second sprocket and the outer tip of the plurality of cups, the deflector being sized and configured to deflect any extra seed to a return mechanism.

49. The planting unit of claim 48, wherein if more than one potato seed is loaded into each cup, the potato seed loaded into the receiving portion of the cup generally stays within the cup and the extra seed is discharged from the cup after the cup traverses the second sprocket.

50. The planting unit of claim 48, wherein a potato seed loaded in the receiving portion of the cup generally stays within the receiving portion of the cup because it is generally aligned with or inward of a pitch line of the chain and it travels at generally the same velocity as the chain.

51. The planting unit of claim 48, wherein any extra potato seed loaded into the cup is displaced outwardly from the receiving portion of the cup, and wherein the extra potato seed is discharged from the cup because it travels at a different velocity than the chain after the cup traverses the second sprocket.

52. The planting unit of claim 48, wherein the plurality of cups are attached to the chain at an angle such that potato seed tends to be received within the receiving portion of the cup.

53. The planting unit of claim 48, further comprising a vibration unit positioned between the first sprocket and the second sprocket, the vibration unit being adapted to shake potato seed into the receiving portion of the cup.

54. The planting unit of claim 48, further comprising a vibration unit positioned between the second sprocket and the third sprocket, the vibration unit being adapted to shake any extra seeds out of the plurality of cups.

* * * * *